(No Model.)
C. A. SCHIEREN.
LINK DRIVING BELT.
No. 355,890. Patented Jan. 11, 1887.
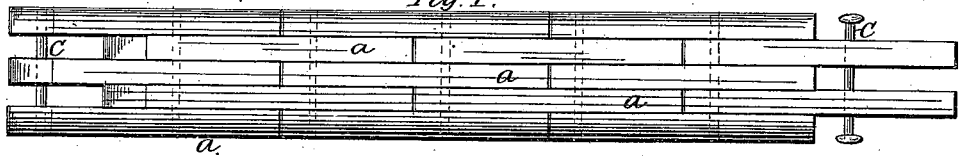
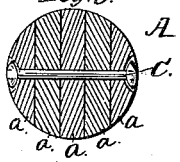 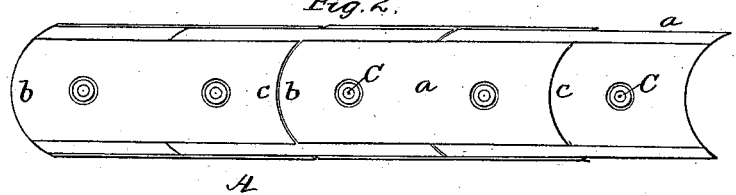
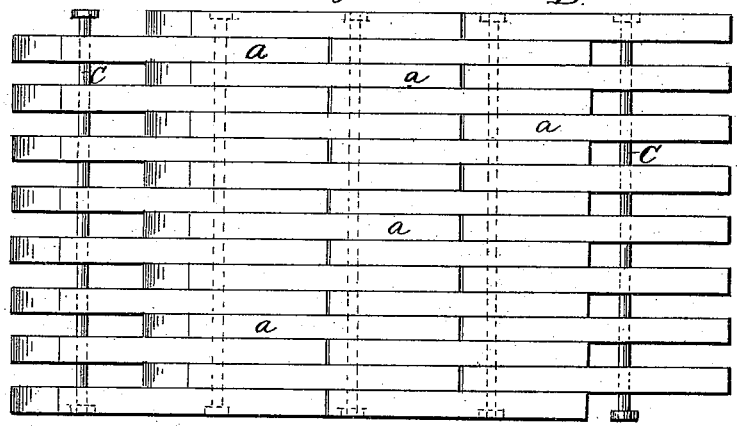 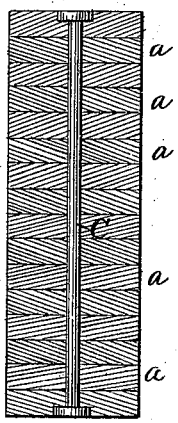
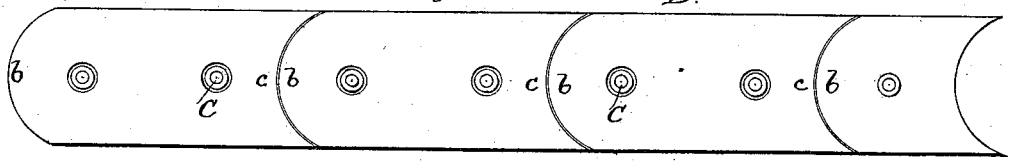
Attest:
M. L. Williams
W. A. Bartlett
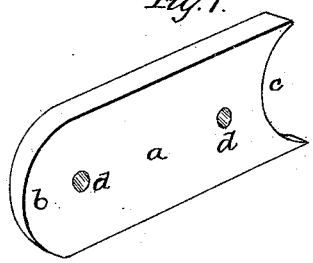
Inventor:
Charles A. Schieren
by J. B. Brock
Atty.

UNITED STATES PATENT OFFICE.

CHARLES A. SCHIEREN, OF BROOKLYN, NEW YORK.

LINK DRIVING-BELT.

SPECIFICATION forming part of Letters Patent No. 355,890, dated January 11, 1887.

Application filed October 27, 1886. Serial No. 217,340. (No model.)

*To all whom it may concern:*

Be it known that I, CHARLES A. SCHIEREN, a citizen of the United States, residing at Brooklyn, in the county of Kings and State of New York, have invented certain new and useful Improvements in Link Driving-Belts; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1 represents a plan view of a section of belting having my improvements applied. Fig. 2 is a side elevation of the same. Fig. 3 is a cross-section of said belt. Fig. 4 represents a plan view of a flat link belt, which also embodies my improvements. Fig. 5 shows a side elevation of the same, and Fig. 6 a cross-section. Fig. 7 is a detail of the link.

My invention relates to link belting.

Heretofore link belts have been made in a variety of forms. The links have been made of leather, wood, and other material, and united by pins or bolts. The links were made with convex rounded ends, provided with compressed ends or treated in other known ways.

My improved link-belt is clearly distinguished from such constructions as have been indicated above and from all others in common use.

My invention consists, therefore, of a peculiarly-shaped link adapted for belt purposes of whatever known shape or form of the belt. It consists more, particularly, of a peculiarly-shaped link adapted also for round belting.

In link belts as heretofore constructed the abutting convex ends of the links leave between them an open space, so that the belt does not get its maximum hold upon the pulleys over which it passes. In my invention, in which one end of each link is convex and the adjoining one concave, this objection is entirely obviated, and the belt gets its full frictional hold upon the pulley. Moreover, the peculiar shape of my improved link enables me to construct a round link belt of perfect shape—a construction heretofore impracticable when made from links of other known shapes.

In the drawings, A represents a section of a round link belt. This belt is composed of five layers or series of links arranged side by side and breaking joints with each other. Any number desired may be arranged side by side, so that the rotundity of the belt is preserved.

B represents a section of flat belting. The width of this style of belt may be increased indefinitely by adding other links to the sides and increasing the length of the connecting-pins.

*a* represents the link.

*b* is the rounded convex end, and *c* the rounded concave end, of the link.

*d* are the holes through which the pins or bolts C pass.

The rounded ends of all the links are struck from the same center, and the concave end of one link abuts against the convex end of the adjoining link. A close joint is thereby secured, but at the same time it is free to bend to conform to the periphery of the pulleys over which it passes.

In flat link belts the links are all of the same size or struck from the same die; but in round link belts the links are of varying shapes to conform to the roundness of the belt. These varying sizes may be secured by using different dies; or the shape may be given the belt by trimming or dressing it after it has been linked together.

The curvatures of the link ends *b c* are struck from the holes *d*. The outer links of the belt are recessed or countersunk about the outer ends of the holes *d* for the purpose of countersinking, on the one side, the bolt or pin-head of bolt C and, on the opposite side, the washers or nuts in which the bolts are riveted or screwed. These links *a* may be made from any known material suitable for the purpose. I contemplate making the links from leather, which is the material generally used for this purpose. The leather may be either rawhide or tanned.

I have shown my invention applied to flat or round belts; but it may be applied to V-shaped or other forms of belts.

My improved belt, whether in the round or flat form, forms a perfectly solid belt, and at the same time pliable and flexible.

Where leather is used for the links, it may be compressed, if desired, so as to make the belt more compact.

Previous to my invention round belts, when made of leather, have had to be made quite small in diameter in order to secure the requisite flexibility. By the use of my peculiarly-shaped links a round belt of comparatively large diameter may be employed, owing to the flexibility of the links.

Having described my invention, what I claim as new, and desire to secure by Letters Patent, is—

1. A driving-belt composed of links concaved at one end and convexed at the other and arranged side by side and bolts for fastening the same against lateral and longitudinal displacement.

2. A driving-belt composed of concavo-convex links arranged side by side, adapted to break-joints, and bolts for fastening the links against lateral and longitudinal displacement.

3. A driving-belt substantially round in cross-section and composed of concavo-convex links lying side by side and bolts for uniting the links.

In testimony whereof I affix my signature in presence of two witnesses.

CHAS. A. SCHIEREN.

Witnesses:
T. H. M. BURRELL,
CHAS. SCHLEGEL.